March 9, 1943. C. D. WHITTENBERGER 2,313,691
BROOM RAKE
Filed March 20, 1940 2 Sheets-Sheet 1

INVENTOR.
Charles D. Whittenberger
BY Frank M. Slough
His ATTORNEY.

March 9, 1943. C. D. WHITTENBERGER 2,313,691
BROOM RAKE
Filed March 20, 1940 2 Sheets-Sheet 2

INVENTOR.
Charles D. Whittenberger
BY Frank M. Slough
HIS ATTORNEY.

Patented Mar. 9, 1943

2,313,691

UNITED STATES PATENT OFFICE 2,313,691

BROOM RAKE

Charles D. Whittenberger, Akron, Ind., assignor to The American Fork & Hoe Company, Cleveland, Ohio, a corporation of Ohio Application March 20, 1940, Serial No. 324,948

5 Claims. (Cl. 56—400.17)

My invention relates to improvements in rakes and relates particularly to improvements in rakes of the so-called "broom rake" class.

An object of my invention is to provide an improved rake wherein the tines are individually secured to the head of the rake.

Another object of my invention is to provide a rake of the character described wherein the tines are flexible and may be made of resilient spring steel and yet which may be manufactured at low cost.

Another object of my invention is to provide a rake of the character described wherein flexible tines are securely fastened to the rake head but without interfering with limited flexibility of movement of the tines.

Another object of my invention is to provide a rake of the character described wherein tines are securely fastened against lateral movement in the rake head.

Other objects of my invention and the invention itself will become increasingly apparent from the following description and drawings wherein.

Figure 5:
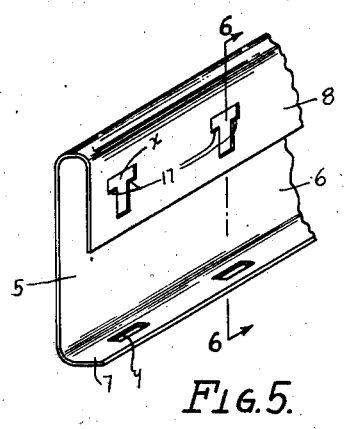
Fig. 5 is a view of the cross head of Fig. 1, but showing the said cross head before insertion of the tines therein.

Referring now to the different figures of the drawings, in all of which like parts are indicated by like reference characters, at 1, I show a rake head comprising a handle supporting socket element 2 presenting an open tapered socket for receiving a corresponding tapered end of a rake handle 3 at one end, and at the other end the socket element is provided with a substantially planular flange 4 adapted to support a cross head 5 of channeled form. The cross head 5 comprises an intermediate top wall or web 6 and two end walls or flanges 7 and 8, the rear end wall 8 having a portion thereof folded back under and spaced from the top wall 6, said portion, as shown in Fig. 5, being provided with a series of T-shaped perforations x therein, which perforations are aligned with slots y in the forward flange 7 or forward end wall of the cross head.

Suitable means such as a pair of rivets 9 are employed to rigidly secure the socket element flange 4 to the intermediate wall 6 of the channeled cross head element 5 with the tapered socket portion 2 presented rearwardly and upwardly at an acute angle to the plane of the cross head intermediate wall to which the flange 4 is secured.

A plurality of tine elements 10, of any desired number, 18, 20, 22, 24 and 26 being commonly employed, are supported in the cross head, these preferably being made of spring steel from flat stock, and having the free ends bent downwardly in a curve as shown at 11 for ground engagement and the rear ends of said tines as shown at 12 preferably having a small portion of the end thereof lapped back upon the rear edge of the tine.

A short distance inwardly of the rear end of the tine, the tine is cut out to form a pair of opposite U-shaped notches 13, shoulders 14 connecting said notched out portions of the tine with the rearmost end of the tine and shoulders 15 connecting the remaining portion of the tine to the neck portion 16 formed by said U-shaped notches.

Figure 1:
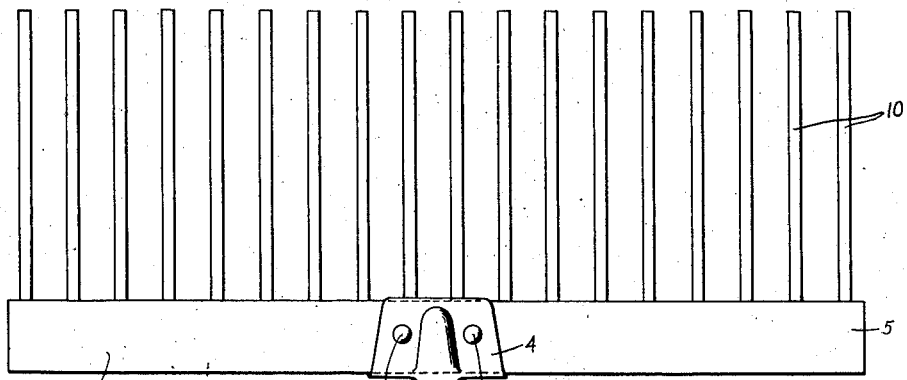
Fig. 1 is a front plan view of a rake embodying the principles of my invention, the handle illustrated as having the handle broken away therefrom.
Figure 7:
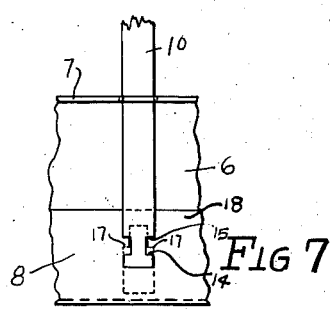
Fig. 7 is an enlarged view of a fragmentary portion of the assembled cross head and tine securing means of Fig. 1.
Figure 3:
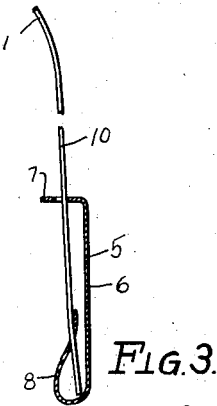
Fig. 3 is a section taken on the line 3—3 of Fig. 2 but enlarged to full size.

The rear ends of the tines so formed are projected through the T-shaped perforations in said end wall 8 of the cross head after having first been inserted in a corresponding aligned perforation y in the front wall 7 which perforation is preferably of such size relative to the tine dimension as to permit the tine a limited amount of movement therein in both vertical and lateral directions. The tines and T-shaped perforations are so formed relative to each other that when a press or other tool is placed lengthwise of the cross head and pressed down upon the underside of the cross head, the rear wall 8 is compressed to the shape shown in Fig. 3 and the cut out portions of the wall 8 which form ears 17 are wedged against the necked in portion of the tine entering the U-shaped notches 13 thereof and prevent the tines from lateral movement in the cross head and the shoulders 15 and adjacent portions of the tine are compressed upon the edge or rim portion 18 of the end wall 8 and the tine is thus securely mounted in the cross head.

Figure 2:
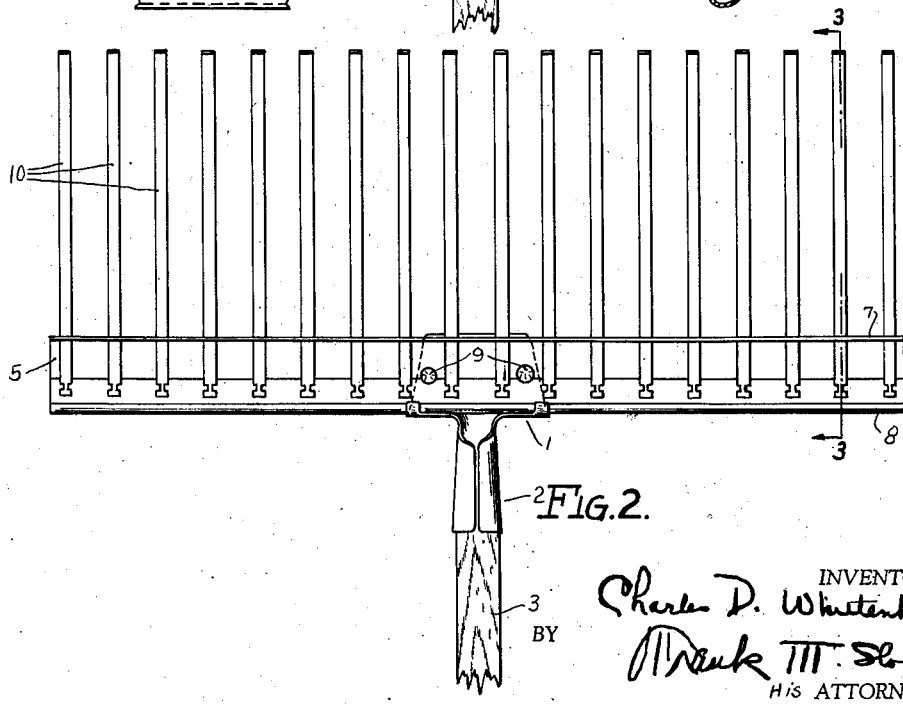
Fig. 2 is a rear plan view of the rake of Fig. 1.
Figure 4:
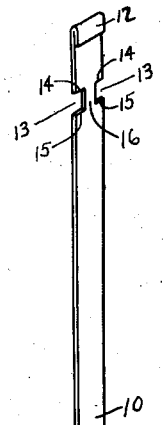
Fig. 4 is a view of the tine element of Fig. 1.
Figure 6:
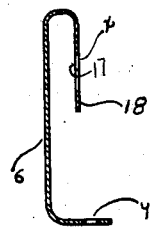
Fig. 6 is a view taken on the line 6—6 of Fig. 5.
Figures 8, 9:
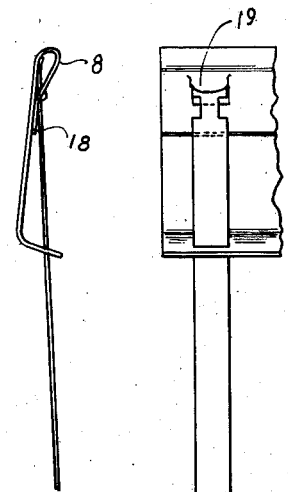
Fig. 8 is a fragmentary view of an embodiment of my invention.
Fig. 9 is an edge elevational view of the fragment disclosed in Fig. 8.

The socket element flange 4 is then secured to the cross head by means of the rivets 9, as above described and said rivets, as best illustrated in Fig. 2 hereof, on the under side of said cross head are lapped over the edge portion 18 of the end wall to more securely secure the same to the cross head. In the embodiment shown in Figs. 8 and 9, the end wall 18 is further provided at the upper end of the T-shaped perforation with a lip or cutout 19 which is also pressed down upon the tine when the tine is assembled therewith, as shown in Fig. 9. In compressing the folded over portion of the end wall 8 and the tines together, the edge portion 18 of the end wall is pressed flush against the intermediate wall 6 and, in this form, the rear end of the tine is not folded over, as in the embodiment of Fig. 4.

In operation, after the tines have been assembled with the cross head as above described, when the rake is put in use and the operator, in sweeping leaves or the like, exerts downwardly directed pressure on the handle, this is transmitted by the rake head to the tines. Pressure engagement of the tip ends of the tines with the ground will cause the tines to resiliently flex. When this occurs, due to the fact that the engagement by the foremost tine support flange or end wall with the tine is a fulcruming engagement, the tine may rock slightly on the foremost flange to effect a limited amount of resilient yielding by the tine portion disposed just rearwardly of said front end wall. This construction is thus less susceptible to breakage than the usual broom rake construction.

I am aware that the form both of the cross head and the tines may be varied and that any preferred socket arrangement could be utilized without departing from my inventive concept.

I am further aware that numerous and otherwise extensive departures may be made from the embodiment herein illustrated and described without departing from the principles of my invention, and the scope of the appended claims.

I claim:

1. A tine for rakes having a substantially longitudinally extending main portion, a downwardly extending ground engaging portion, said main portion being provided adjacent its rear end portion with a necked-in portion of relatively lesser width than the remainder of the tine forward or rear end portions whereby oppositely disposed shoulders are provided which are adapted to have locking engagement with a rake crosshead having perforations disposed therein of substantially the dimensions of the width of said tine.

2. In a rake, a cross head having a forwardly disposed downwardly extending flange portion and a rearwardly disposed flange portion, each of said flange portions being provided with aligned perforations, a tine having a substantially longitudinally extending main portion, said main portion adjacent its rear end portion being provided with a necked-in portion thereby providing oppositely disposed shoulders, said tine being of such width through its length as to be projected through said perforation provided in said forwardly disposed flange and through the said perforation in the rearmost flange, said rearmost shoulder portion being projected within said perforation and said other shoulder being disposed forwardly of said perforation whereby upon pressure being exerted on said tine and associated rearmost flange said tine and associated rear flange are depressed and said tine is thereby securely locked in said cross head.

3. In a rake, a cross head having a forwardly disposed downwardly extending flange portion and a rearwardly disposed flange portion, each of said flange portions being provided with aligned perforations, a tine having a substantially longitudinally extending main portion, said main portion adjacent its rear end portion being provided with a necked-in portion thereby providing oppositely disposed shoulders and a U-shaped notch on either side of said necked-in portion between each of said oppositely disposed shoulder portions, said tine being of such width through its length as to be projected through said perforation provided in said forwardly disposed flange and through the said perforation in the rearmost flange, said rearmost shoulder portion being projected within said perforation and said other shoulder being disposed forwardly of said perforation whereby said notched portions are disposed partially within said perforation and partially without said perforation and upon pressure being exerted on said tine and associated rearmost flange said tine and associated rear flange are depressed and said tine is thereby securely locked in said cross head.

4. In a rake, a cross head having a forwardly disposed downwardly extending flange portion and a rearwardly disposed flange portion, each of said flange portions being provided with aligned perforations, a tine having a substantially longitudinally extending main portion, said main portion adjacent its rear end portion being provided with a necked-in portion thereby providing oppositely disposed shoulders and a U-shaped notch on either side of said necked-in portion between each of said oppositely disposed shoulder portions, said tine being of such width through its length as to be projected through said perforation provided in said forwardly disposed flange and through the T-shaped perforation in the rearmost flange, said rearmost shoulder portion being projected within said perforation and said other shoulder being disposed forwardly of said perforation whereby said notched portions are disposed partially within said perforation and partially without said perforation and upon pressure being exerted on said tine and associated rearmost flange said tine and associated rear flange are depressed and said tine is thereby securely locked in said cross head, a portion of said necked-in portion of said tine being depressed thereby into the stem of the T-shaped perforation and said tine thereby prevented from lateral movement in said cross head.

5. A method of making rakes which consists in forming a substantially rectangular metal cross head with T-shaped perforations adjacent one longitudinally extending edge thereof and substantially rectangular slots adjacent the opposite edge thereof, said slots being aligned, bending said opposite edges downwardly to dispose said slots in further alignment, projecting tines of substantially narrow strips of metal having a pair of oppositely disposed U-shaped notches adjacent their rearmost end portion through the said rectangular slots, placing the rear ends thereof in said T-shaped perforations in the cross head, a portion only of each of said U-shaped notches being inserted within the cross head beyond the yoke of each T-shaped perforation, pressing the metal of said rear flange of said cross head upon said tines to wedge a portion thereof against the necked-in U-shaped notched portion of the tines whereby the tine is securely mounted in the cross head.

CHARLES D. WHITTENBERGER.